United States Patent
Willis

[15] 3,693,329
[45] Sept. 26, 1972

[54] HUB ASSEMBLY FOR IN-LINE CENTRIFUGAL SEPARATOR

[72] Inventor: Robin Burke Willis, Edmonton, Alberta, Canada

[73] Assignee: Porta-Test Manufacturing Ltd., Edmonton, Alberta, Canada

[22] Filed: Aug. 24, 1970

[21] Appl. No.: 66,468

[52] U.S. Cl. ...................55/457, 55/340, 138/37, 138/39, 209/211, 210/512
[51] Int. Cl. .............................................B01d 45/12
[58] Field of Search........55/338, 339, 340, 347, 348, 55/456, 457; 209/144, 211; 138/37, 39; 210/512

[56] References Cited

UNITED STATES PATENTS

| | | | |
|---|---|---|---|
| 2,569,909 | 10/1951 | Umney | 55/347 |
| 2,918,139 | 12/1959 | Silverman | 55/339 |
| 3,254,478 | 6/1966 | Szego | 55/340 |
| 3,360,909 | 1/1968 | Barnevias | 55/348 |
| 3,517,821 | 6/1970 | Monson et al. | 55/457 |

FOREIGN PATENTS OR APPLICATIONS

| | | | |
|---|---|---|---|
| 1,146,262 | 3/1969 | Great Britain | 55/57 |

*Primary Examiner*—Bernard Nozick
*Attorney*—Ernest Peter Johnson

[57] ABSTRACT

The hub assembly comprises a cigar-shaped hub carrying vanes. The hub defines a central bore opening at the downstream end. Two or more vanes define conduits leading into the bore.

The assembly is normally mounted in the inlet of a vortex tube. The vanes force the gas flow into helical paths for centrifugal separation of entrained liquid. The bore and conduits connect the low pressure zone at the axis of the vortex tube with the space exterior of the vortex tube.

7 Claims, 3 Drawing Figures

PATENTED SEP 26 1972

3,693,329

INVENTOR: ROBIN BURKE WILLIS

AGENT: Ernest Peter Johnson

HUB ASSEMBLY FOR IN-LINE CENTRIFUGAL SEPARATOR

BACKGROUND OF THE INVENTION

This invention relates to a hub assembly for use in a centrifugal separator of the in-line recycling type.

Reference is made to co-pending U.S. Pat. application Ser. No. 66,545 wherein an in-line recycling separator is described.

This type of separator has an outer shell which is open-ended and cylindrical in form. In use, the shell is tied into a flowline carrying a gas flow containing a small quantity of entrained liquid. Positioned within the shell is at least one vortex tube. Each vortex tube comprises two co-axial tubes spaced apart longitudinally to define a circumferential gap between them. The vortex tube and shell define an annular space between them which is suitably closed at its ends. The interior of the vortex tube and the exterior annular space communicate via the circumferential gap. The inlet and outlet of the vortex tube communicate the inlet and outlet of the shell so that the pipeline flow passes through the vortex tube.

A hub assembly is mounted within the inlet end of the vortex tube. This hub assembly comprises a cigar-shaped hub which is concentrically fixed within the vortex tube. An annular passage is defined between the hub and the vortex tube wall. The hub carries a number of curved vanes which protrude into this passage. The hub also defines a longitudinal bore which communicates the vortex tube interior at the hub's downstream end. The hub assembly includes a cross pipe connecting the upstream end of the bore with openings in the upstream end of the vortex tube wall.

The hub assembly has several functions, namely:

1. It causes acceleration of the pipeline flow by providing a restriction in the flow path.
2. Its vanes force the flow to follow helical paths around the inner surface of the vortex tube. This, of course, results in centrifugal separation of the liquid from the gas. The liquid accumulates as a layer along the vortex tube wall.
3. The conduit formed by the bore and cross pipe connects a low pressure zone, which exists along the longitudinal axis of the vortex tube, with the annular space. As a result, the annular space is maintained at a lower pressure than that which exists at the periphery of the interior space of the vortex tube. This results in suction being applied at the vortex tube gap — the liquid and some gas are therefore sucked into the annular space. The liquid falls to the bottom of the annular space due to gravity and the gas is recycled into the vortex tube via the conduit.

SUMMARY OF THE INVENTION

The present invention is directed to an improved hub assembly. According to its key feature, the various parts of the assembly have been integrated into a single integral part which can be easily and cheaply cast or molded. This contrasts with previous assemblies whose parts had to be welded together.

Turning now to providing a broad description of the assembly, it includes an elongate hub. This hub carries four vanes. The vanes protrude outwardly from the hub at spaced intervals. They are longitudinally curved so as to define with the hub four peripheral, curved grooves extending lengthwise along the hub. The hub defines a bore along its longitudinal axis. This bore is open at its downstream or second end but does not quite extend all the way back to the hub's upstream or first end face. The bore is therefore closed at its upstream end.

The assembly is generally cylindrical in form so as to fit snuggly within a vortex tube. The longitudinal axis of the hub coincides with the center of a circle drawn around and tangential to the outermost surfaces of the vanes in a plane at a right angle to the said axis. When the assembly is mounted within a vortex tube, the bore communicates the interior of the vortex tube at its longitudinal axis. The bore therefore opens into the low pressure zone which exists within the gas vortex disposed along this axis when the separator is in operation.

One pair of oppositely disposed vanes is thicker at their upstream or first ends than the other pair of vanes; a sealed passageway connecting the upstream end of the hub bore with an opening in the vane's outermost surface is formed or defined by each of the thick vanes. When the assembly is welded into place in a vortex tube, the passageway opening registers with an opening in the vortex tube wall. As a result, the bore and passageway provide a sealed conduit connecting the annular space about the vortex tube with the low pressure zone within it.

By having vanes which are an integral part of the hub assembly and directing the passageway through one of the vanes, an assembly is provided which can be formed, as by casting, into one integral unit or part.

DESCRIPTION OF THE DRAWINGS

In drawings which illustrate an embodiment of the invention.

DESCRIPTION OF THE PREFERRED EMBODIMENT

Figure 1:
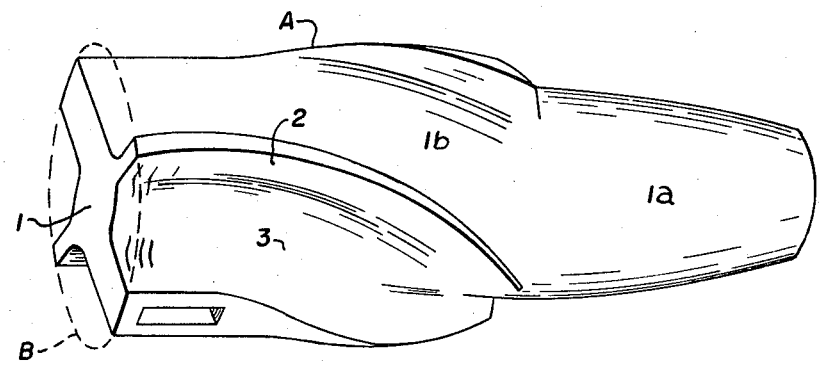
FIG. 1 is a perspective view of the hub assembly.
Figure 2:
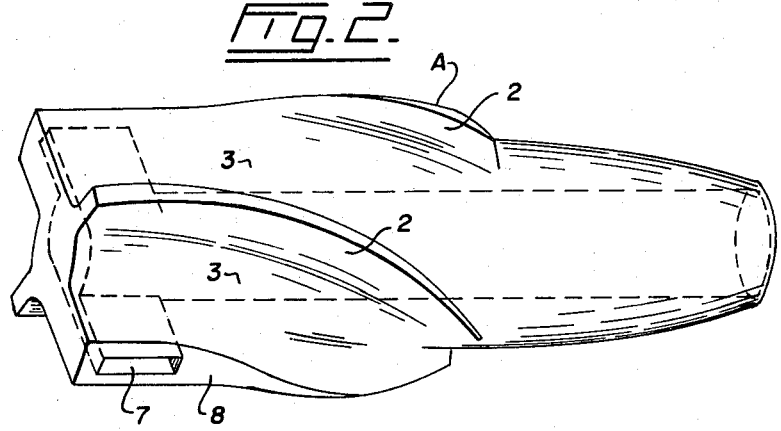
FIG. 2 is a view similar to that of FIG. 1 with the bore and passageway shown in dotted lines.
Figure 3:
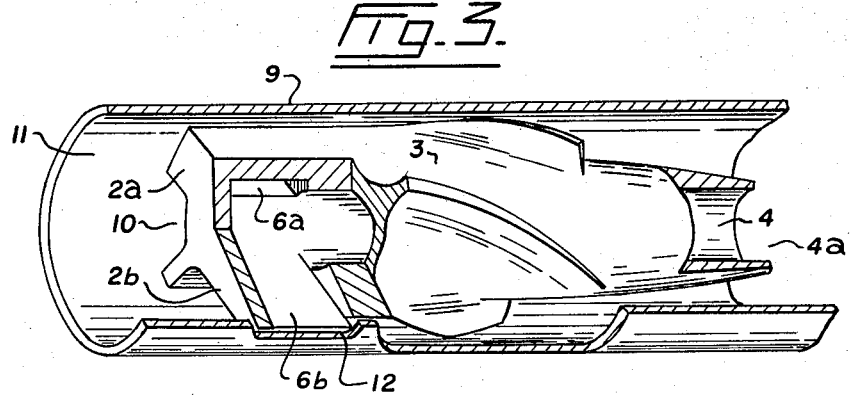
FIG. 3 is a perspective view, partly broken away, showing the hub assembly mounted within a vortex tube.

Referring now to FIG. 2 and 3, a hub assembly A in accordance with this invention includes a hub 1 carrying vanes 2. Hub 1 and vanes 2 combine to define helical grooves 3. A longitudinal bore 4 is defined by hub 1. This bore 4 terminates at the downstream or second end of hub 1 at opening 4a. Passageways 6a, 6b extend into vanes 2a, 2b from openings 7 in outermost surfaces 8. These passageways 6a, 6b open tangentially into bore 4 at their inner ends.

FIG. 3 shows hub assembly A mounted in a vortex tube 9. When in place, the assembly A combines with the inner surface 11 or vortex tube 9 to define passages 10. As shown, each vane opening 7 registers with an opening 12 in the wall of vortex tube 9.

The hub 1 comprises two integral sections 1a, 1b. Section 1b is essential to the invention, section 1a is optional.

Section 1b can be described as a solid cylinder which has four longitudinal, curved grooves 3 in its periphery. A circle B can be drawn to connect the outer edges of vanes 2. The diameter of circle B is the "outside diameter" of the hub assembly A. This "outside diameter" is referred to hereinbelow in describing some of the dimensions of the assembly.

Because it has a cylindrical form, section 1b is adapted to fit snuggly within vortex tube 9. Other hub configurations, such as a conical form, can be used; however the cylindrical shape is preferred.

Tailpipe section 1a is conical in form, tapering from about ⅔ "outside diameter" to near bore size. It functions to smooth the flow discharging from grooves 3 and diminishes turbulence.

Turning now to the hub assembly grooves 3, several factors need to be considered in selecting their number, size and shape. Firstly, the direction of the flow into the vortex tube must be twisted enough by the grooves to ensure a desirable degree of centrifugal separation therein. Secondly, it is usually necessary to keep the pressure drop across the separator low. These two objectives are not compatible with each other. With a change in direction of flow, the gas velocity increases. This increase in velocity is accompanied by a pressure drop. Therefore, the greater the induced change in flow direction, the greater will be the pressure drop across the separator. Thirdly, it is preferable to use a hub which has a large cross sectional area relative to the interior cross sectional area of the vortex tube 9. By spreading the flow around a large central hub, a central space 12 is ensured downstream from the hub into which the gas can converge. When the gas converges into this space 12, its rotational speed increases. This leads to a desired degree of centrifugal separation. Finally, it is preferable to use four grooves which rotate through less then 90° i.e., the downstream ends of which lie at angles of less than 90° with respect to the upstream ends as measured around the periphery of the hub. This groove structure contributes substantially to ease of manufacture by casting and is adapted to generate the type of spin desired with a reasonably low pressure drop.

As a result of considerable experimentation, I have arrived at a preferred groove design which does the job and is easy to manufacture. More specifically, I provide four curved grooves 3 of substantially equal cross-sectional area which rotate through an angle selected from the range 70° to 90°, preferably 80°, while curving such that their upstream or first ends lie parallel to the hub's longitudinal axis while their downstream or second ends lie at an angle of 30° to 50°, preferably 40°, with respect to the said axis. The total cross-sectional area of the grooves 3 is 0.3 to 0.6, preferably 0.5, times the area of circle B. If the proportion is less than 0.3, the pressure drop will be too high for most uses. If the proportion is greater than 0.6, the apparatus becomes very difficult to cast from steel due to the thinness of the walls.

I combine these grooves 3 with a hub 1 which has a diameter at the downstream or second end about ⅔ the interior diameter of vortex tube 9.

The circular bore 4 extends longitudinally into hub 1 from the downstream end opening 4a. It is centrally located so as to be co-axial with the longitudinal axis of vortex tube 9. Its diameter is between 0.2 and 0.5, preferably 0.3, times the diameter of circle B.

I provide two tangential inlets or passageways 6a, 6b which extend inwardly from openings 7 to communicate the upstream end of bore 4. These passageways 6a, 6b are located substantially opposite to one another. They each have a cross-sectional area about ⅓ the cross-sectional area of the bore 4 and are adapted to induce the recycle flow in the fore to follow a helical path having an angularity of about 30°.

I claim:

1. A hub assembly comprising:
    an elongate hub, having first and second ends, said hub carrying four outwardly protruding, longitudinally curved vanes defining, in combination with the hub, four peripheral, curved grooves extending lengthwise along the hub, said grooves each rotating through an angle of less than 90°, one pair of oppositely disposed vanes being thicker at their first ends than the other pair and said grooves being of substantially equal cross-sectional area;
    said hub defining a centrally located, longitudinal bore which is open at the second end thereof and closed at the first end;
    each said thick vane defining a passageway connecting the first end of the bore with an opening in the outermost surface of the vane.

2. The hub assembly as set forth in claim 1 wherein:
    the hub and vanes are cast to provide an integral part.

3. The hub assembly as set forth in claim 2 wherein:
    the grooves are curved such that their downstream ends lie at an angle of 30° to 50° with respect to the hub's longitudinal axis.

4. The hub assembly as set forth in claim 2 wherein:
    the grooves rotate through an angle selected from the range 70° to 90°.

5. The hub assembly as set forth in claim 4 wherein:
    the sum of the cross-sectional areas of the grooves is between 0.3 and 0.6 times the area of a circle having a diameter equal to the outside diameter of the hub assembly.

6. The hub assembly as set forth in claim 5 wherein:
    the hub bore is cylindrical and its diameter is between 0.2 and 0.5 times the diameter of a circle having a diameter equal to the outside diameter of the hub assembly. In the disclosure:

7. The hub assembly as set forth in claim 6 wherein:
    the vane passageway opens tangentially into the bore.

* * * * *